United States Patent [19]

Husseiny et al.

[11] Patent Number: 5,400,619
[45] Date of Patent: Mar. 28, 1995

[54] FREEZING PURIFICATION SYSTEM AND METHOD FOR DECONTAMINATION AND DESALINATION OF WATER

[75] Inventors: Abdo A. Husseiny, LaPlace, La.; Jerry E. Lundstrom, Andover, Mass.

[73] Assignee: Technology International Incorporated, LaPlace, La.

[21] Appl. No.: 166,399

[22] Filed: Dec. 14, 1993

[51] Int. Cl.[6] ............................................. B01D 9/04
[52] U.S. Cl. .......................................... 62/532; 62/74; 62/123
[58] Field of Search ............................ 62/532, 123, 74

[56] References Cited

U.S. PATENT DOCUMENTS

| | | | |
|---|---|---|---|
| 4,457,769 | 7/1984 | Engdahl et al. | 62/532 |
| 4,936,114 | 6/1990 | Engdahl et al. | 62/532 |
| 5,037,463 | 8/1991 | Engdahl | 62/532 |

OTHER PUBLICATIONS

Chapter Entitled "Deselinization By Freezing" by Herbert Wiegandt appearing in *Deselinization Handbook*, edited by M. Salaban, VCH, Weinheim Article entitled Iced Out.

*Primary Examiner*—Ronald C. Capossela
*Attorney, Agent, or Firm*—Sixbey, Friedman, Leedom & Ferguson

[57] ABSTRACT

Both a system and method are provided for purifying contaminated raw water into potable water by freezing. The system of the invention includes an ice grid having heat exchange surfaces that define cavities for producing ice solids having a surface to volume ratio no greater than 25 to 1, a refrigeration unit for indirectly cooling the heat exchange surfaces to at least the freezing point of the raw water, and an array of spray nozzles that continuously flows raw water over the cavities of the ice grid such that ice solids form from substantially pure water incrementally built up from the heat exchange surfaces of the grid to ultimately fill the grid cavities. The raw water is frozen slowly enough so that unfrozen contaminants expelled from the incrementally freezing ice are continuously washed away from the surface of the growing ice by a continuously raw water flow. After the freezing operation is completed, the resulting ice solids are rinsed with previously purified water to remove any contaminants lodged on their surfaces. The relatively low surface to volume ratio of the resulting ice solid results in a high percentage of pure water reclamation, as excessive melting of the pure water ice solids during the rinsing step is avoided.

30 Claims, 16 Drawing Sheets

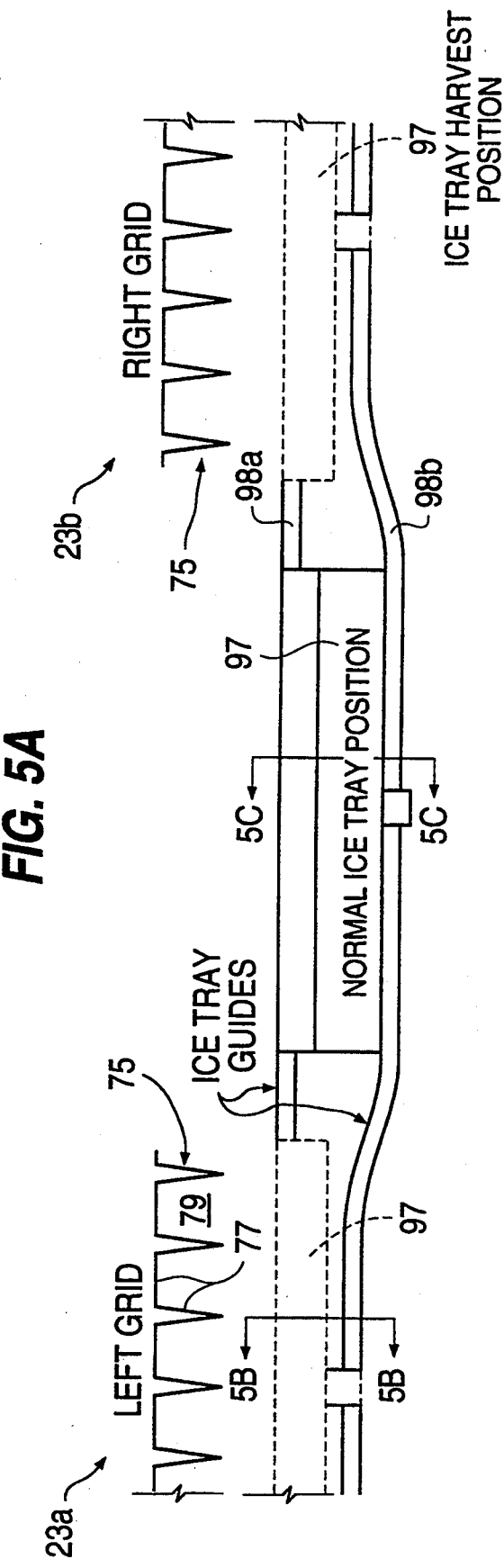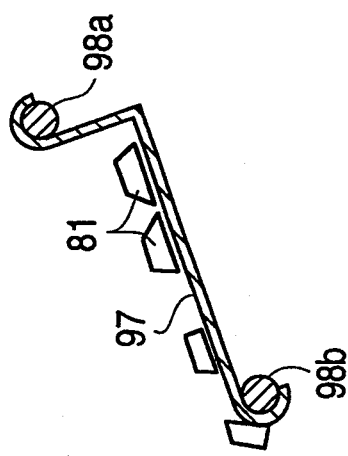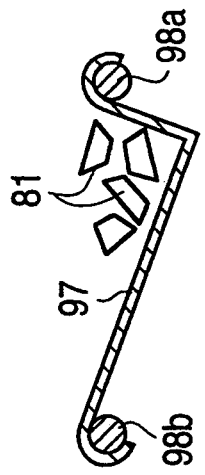

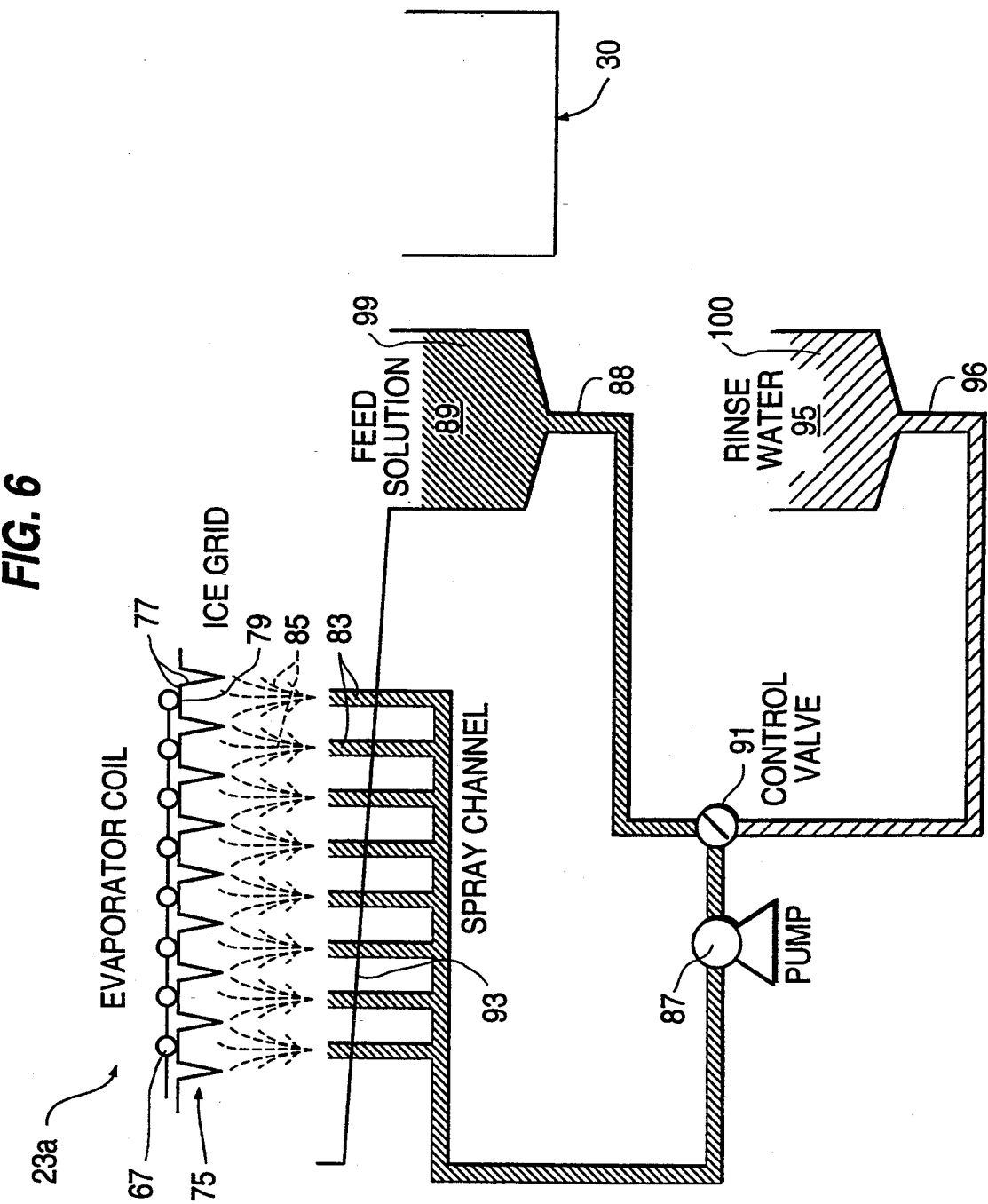

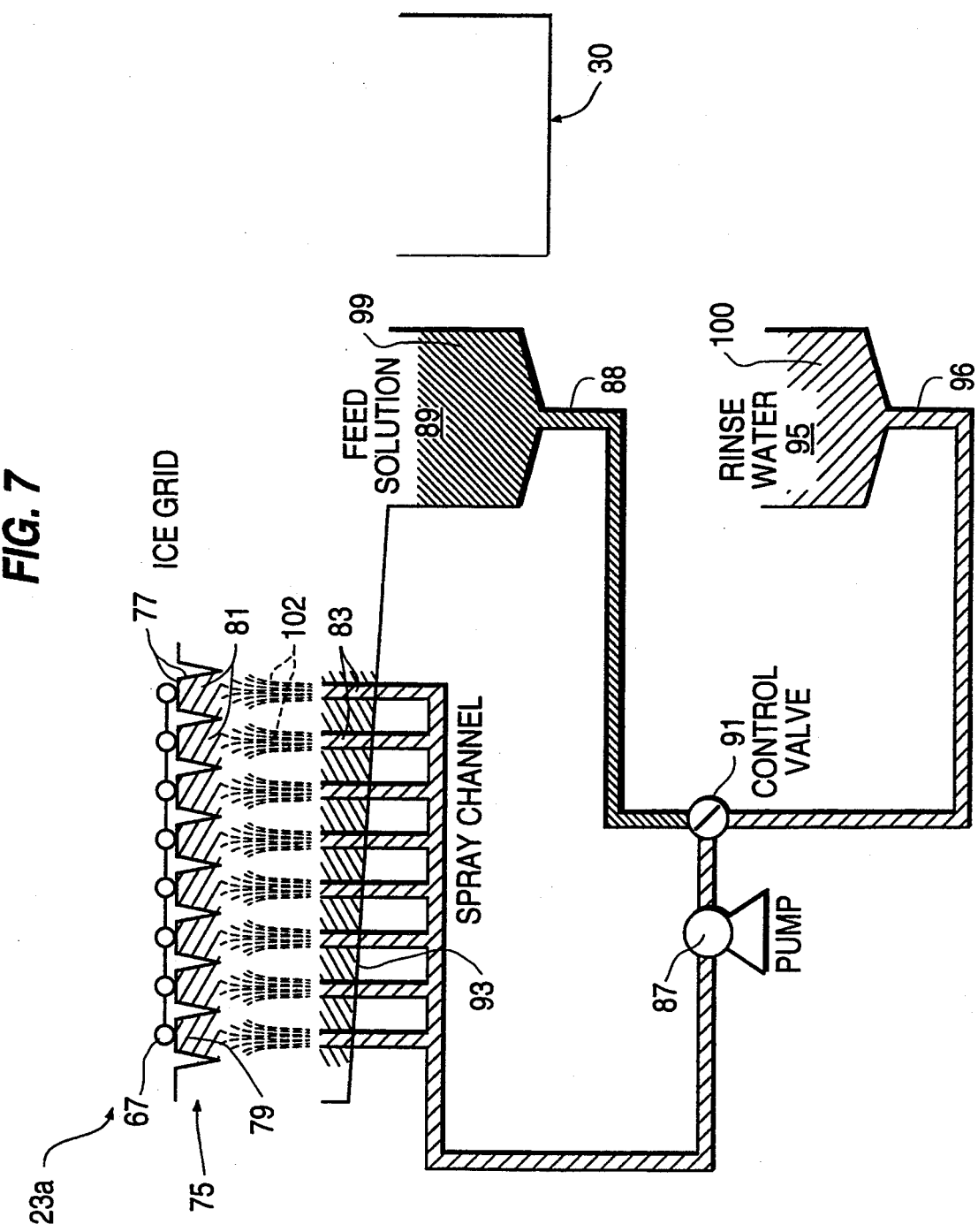

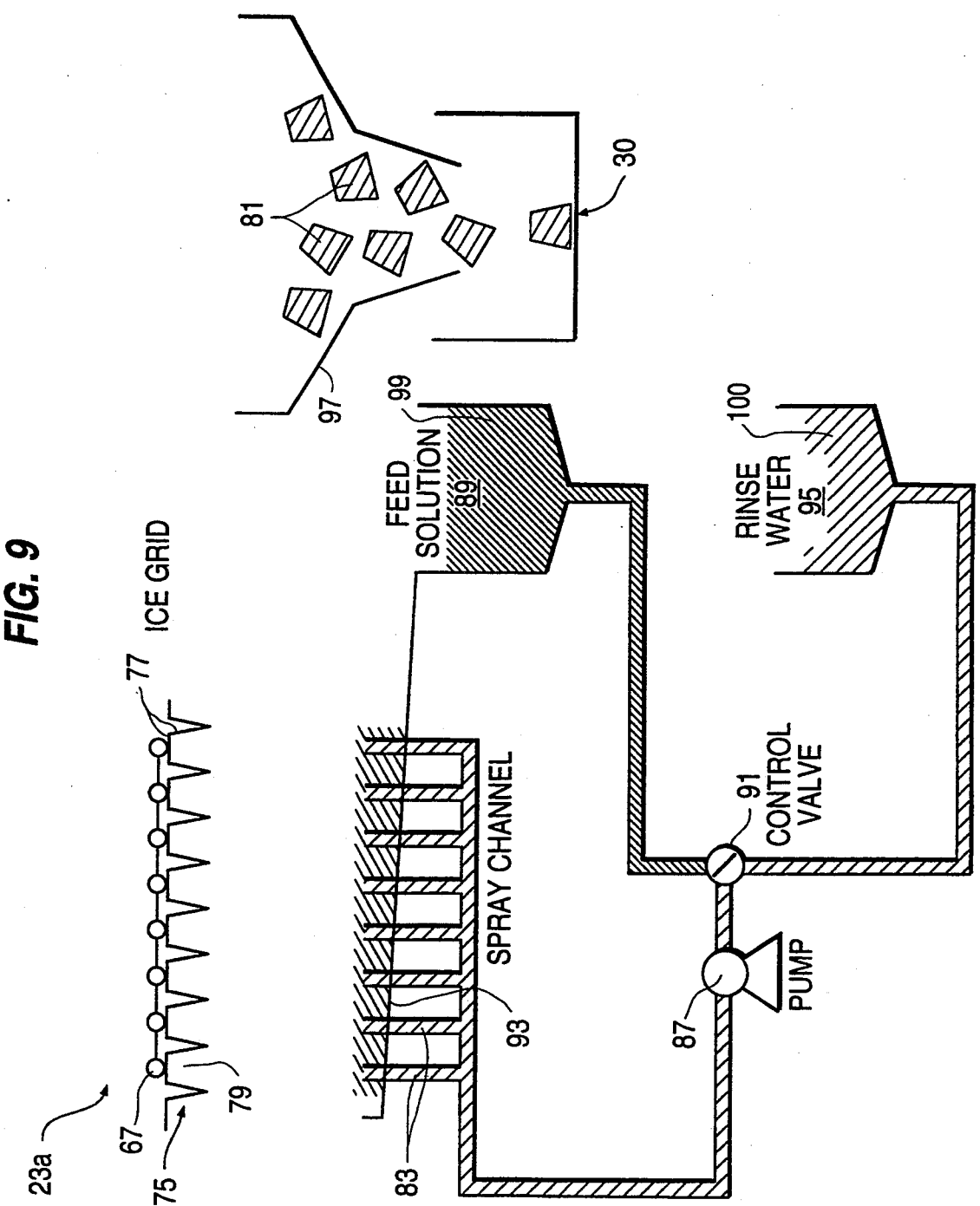

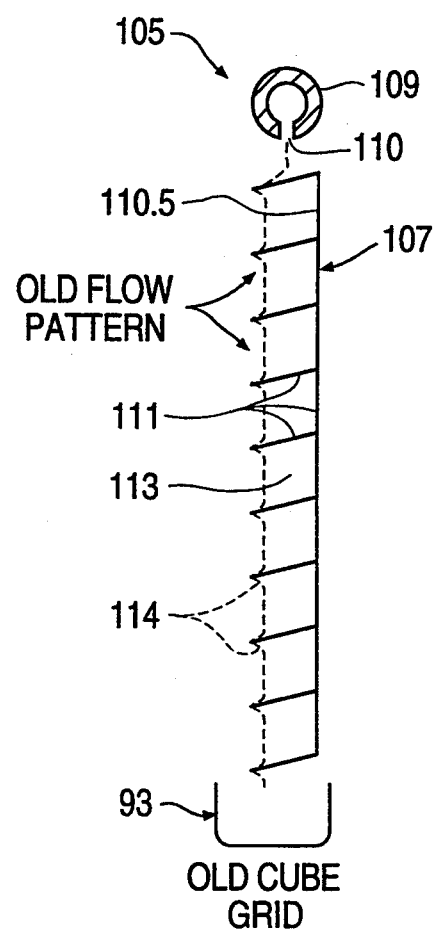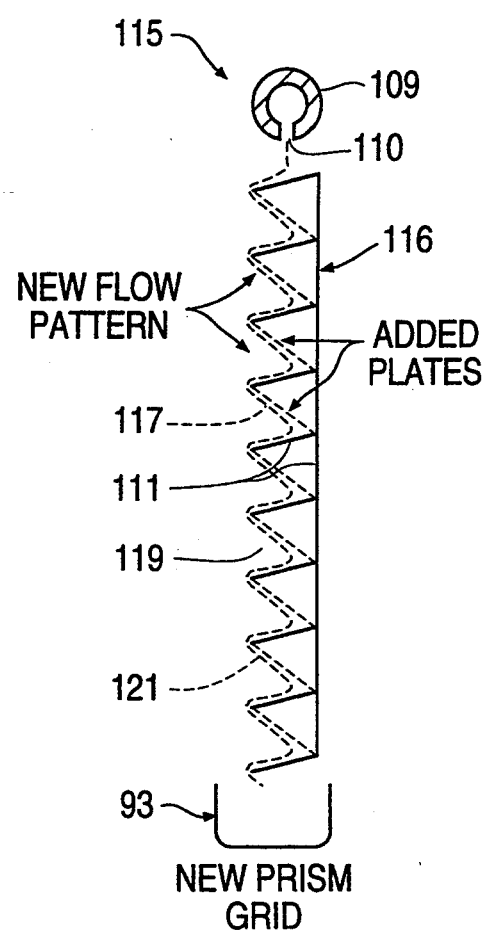
FIG. 10A
FIG. 10B

FREEZING PURIFICATION SYSTEM AND METHOD FOR DECONTAMINATION AND DESALINATION OF WATER

BACKGROUND OF THE INVENTION

This invention generally relates to the purification of sea water, brackish water, or contaminated fresh water, and is specifically concerned with a portable system and method for the bulk purification of raw or contaminated water by a freezing method wherein the pure water component of the raw contaminated water is frozen out. A continuous flow of the raw water is used to wash away the solid and gaseous contaminants from the surface of the pure water ice as it forms so that the contaminants do not become entrapped back into the ice solids.

Portable devices for the bulk purification of sea water or contaminated water are generally known in the prior art. Such devices are particularly useful in military situations where troops are stationed in remote areas of the world where non-potable raw water from the sea or a swamp or the like is the only water available. As the result of the demand that the military has historically had for the bulk purification of non-potable water, both the United States Army and Navy have been among the principal developers of mobile water purification devices. Thus far, the mobile bulk water purification devices developed by the United States military have been based on reverse osmosis technology wherein modules of semi-permeable membranes remove salt and other impurities by well known osmotic principals.

While such prior art water purification devices are capable of fulfilling their intended function, the applicants have observed a number of shortcomings associated with them. First of all, both the construction and operation of reverse osmosis water purification devices are expensive, for a number of reasons. To start with, considerable energy is required to overcome the osmotic pressure of the raw water. Additionally, an elaborate raw water pretreatment system is required to prolong the life of the expensive reverse osmosis membranes used in the device. The design of the pretreatment system depends on the type and amount of contaminants in the raw water, which requires a customized system of filters and other elements which in turn limits the versatility of the purification device. Additionally, the custom design work necessary to create the particular kind of pretreatment system necessitated by the particular contaminants in the raw water that the device will remove is time consuming, costly, and requires an extensive analysis of the raw water to be treated. Even with the best of pretreatment system designs, some degree fouling ultimately occurs in the reverse osmosis membranes, which of course necessitates their replacement. Presently the United States Army uses a trailer mounted Reverse Osmosis Water Purification Unit (designated by the acronym ROWPU) and the U.S. Marine Corp uses a skid-mounted ROWPU. The reverse osmosis modules of such ROWPU units must be replaced every few hundred hours on the average. The estimated replacement cost for the reverse osmosis modules used in a ROWPU having a capacity of 600 gallons per hour exceeds a hundred thousand dollars per year.

Bulk water purification systems that employ the principle of freeze purification are also known in the prior art. Such systems work on the principle that as water freezes, the growing crystals of ice displace and expel contaminants to the surface of the resulting ice body. However, in order to prevent the displaced contaminants from becoming entrapper within the ice crystals, many of these systems employ a direct freezing method which creates ice crystals that are dendritic in shape, which in turn gives them a relatively high surface area per volume of ice (i.e., greater than 100 $cm^2$ per mL). As it is necessary to wash the resulting crystals in pure water in order to remove all surface contaminants before the crystals are melted down to create the resulting yield of purified water, the rinsing of these crystals causes a large percentage of the ice contained therein to melt. Such unwanted melting greatly lessens the resulting yield of purified water, and greatly increases the amount of energy needed to create a specific volume of pure water. Additionally, because the refrigerant comes into direct contact with the water in these methods, it is possible for the resulting product water to be contaminated with the refrigerant. Finally, the direct freezing methods used are relatively difficult to implement, and require the design and construction of specialized equipment which is heavier, bulkier and much more expensive than commercially available ice making machinery.

Accordingly, there is a need for a water purification system that is at least as effective as the ROWPU used by the United States military, but which is smaller, lighter, longer lived, more energy efficient, and more economical both to construct and to operate. Ideally, in military situations, such a system would not only be capable of desalinizing sea water, but would also be capable of removing biological chemical warfare toxins from any available water supply. Such a system should not require a custom built pretreatment system, nor require extensive water analysis and custom engineering to design, nor specialized freezing machinery. Finally, it would be desirable if such a portable bulk water purification unit was small enough and inexpensive enough to be used not only by the United States military, but also by campers, remote area residents, resort areas in which there was little or no natural supply of potable water, and in emergency situations (such as hurricanes and earthquakes) where the supply and distribution of potable water had become temporarily interrupted.

OBJECTS AND SUMMARY OF THE INVENTION

It is an object of the invention to provide a bulk water purification system and method capable of processing raw feed water containing various concentrations of ionic salts, gaseous or vaporous toxic chemicals that have been dissolved into the water, or biological contaminants, and to produce potable water therefrom.

It is another object of the invention to provide a system and method capable of rejecting high percentages of ionic salts, nuclear, chemical and biological warfare agents, and other chemical and biological contaminants including gas, vapor, herbicides and organic pesticides and which is also capable of achieving a high percentage of water recovery, and is further capable of effective operation within a wide range of atmospheric pressures, temperatures and humidities.

It is still another object of the invention to provide a water purification system having a useful life that is longer than the useful life of current bulk raw water purification systems of the same capacity, and which further has the potential for life extension through cost effective replacement of components, and which further has less maintenance down time and maintenance cost than prior art prior art bulk raw water purification systems of the same capacity.

It is still another object of the invention to provide both a water purification system and method which is scalable to different capacities, and which utilizes a mechanism that is generally smaller in size and lighter in weight than the mechanism associated with prior art bulk water purification systems of the same capacity.

It is yet another object of the invention to provide a system and method that requires a relatively small amount of electrical energy per unit of purified water produced, and is otherwise highly energy efficient.

It is the final object of the invention to provide a relatively simple water purification system and method which indirectly freezes the raw water by way of heat exchange surfaces thermally coupled to the evaporator of a commercially available and relatively inexpensive refrigeration unit, and which freezes the water being purified on these heat exchange surfaces at a rate which is fast enough to be commercially practical, but yet slow enough to allow the expulsion and escape of gaseous or vaporous chemical contaminants that are dissolved within the raw water.

The invention eliminates all of the aforementioned shortcomings associated with the prior art, and further achieves each of the aforementioned objects by means of a raw water purification system that generally comprises an ice grid having heat exchange surfaces that define cavities for producing ice solids having a surface to volume ratio no greater than 10 cm$^2$ per mL, and preferably less that 8 to 1; a refrigeration means for indirectly cooling the heat exchange surfaces of the ice grid to at least the freezing point of the raw water introduced into the system, and a means for continuously flowing the raw water over the ice grid such that ice solids formed from substantially pure water incrementally build up from the heat exchange surfaces of fine grid to fill the grid cavities while unfrozen contaminants expelled from the incrementally freezing ice are continuously washed away from the surface of the ice by the continuous flow of raw water.

The ice grid of the system is oriented at an angle such that liquid water introduced into the grid cavities drains out of the cavities by gravity. In the preferred embodiment, the grid is oriented horizontally, with its ice-producing cavities inverted, while the means for continuously flowing raw water over the cavities of the ice grid includes a means for spraying the raw water upwardly into the inverted cavities. In this embodiment, the requisite continuous flow is created by the upward vertical spray into the ice grid cavities in combination with the constant downward draining of the unfrozen raw water out of the cavities. In an alternative embodiment of the system, the ice grid is oriented vertically such that the ice forming cavities are stacked together in higher and lower positions. In this embodiment, the continuous flow means includes a conduit for continuously directing a uniform flow of raw water over the uppermost row of cavities in the ice grid. To insure that the raw water will have a uniform, sheet-like flow over all of the heat exchange surfaces of the ice grid, the heat exchange surfaces are formed from plates which define prism-shaped cavities which, in side cross-section, would form a vertically-oriented sawtooth wave. In both embodiments, the continuous and uniformly sheet-like flow of raw water allows ice to be formed from the pure water component of the raw water while at the same time avoiding the trapping of solid and gaseous chemical contaminants that are being continuously expelled from the upper surfaces of the ice crystals as they grow from the heat exchange surfaces.

The system of the invention further includes a means for rinsing the ice solids produced by the ice grid with pure water so as to remove any chemical contaminants which might have lodged themselves on the surfaces of the ice solids. Finally, the system includes a system for melting the rinsed ice solids to form pure liquid water. In the preferred embodiment, this melting means is powered at least in part by recovery of the waste heat given off by the compressor which powers the refrigeration means.

In the method of the invention, the temperature of the heat exchange surfaces of the ice grid is adjusted such that the resulting ice grows slowly enough to allow the solid and gaseous chemical contaminants expelled by the ice crystals to be completely washed away from the surface of the growing ice by the continuous flow of raw water thereover. In the preferred method of the invention, the temperature is adjusted such that the cavities of the ice grid are completely filled with ice prisms having linear dimensions between 0.5 and 1.0 inches anywhere between 15 and 35 minutes.

Further in the method of the invention, the unfrozen component of the raw water is mixed with incoming raw water and recirculated back up into the grid cavities so that a maximum amount of pure water can be created from a minimum amount of raw water.

BRIEF DESCRIPTION OF THE SEVERAL FIGURES

FIG. 5A is an enlarged view of the ice collection trough of the freezer assembly used to collect ice solids from the two freezer units illustrated in FIG. 4;

FIGS. 5B and 5C are schematicized side views of the ice trough along the lines 5B—5B and 5C—5C of FIG. 5A illustrating the manner in which the trough is tilted for harvesting the ice from the ice grids and for dumping the ice into the ice collection bin of the system; respectively;

Figure 11:
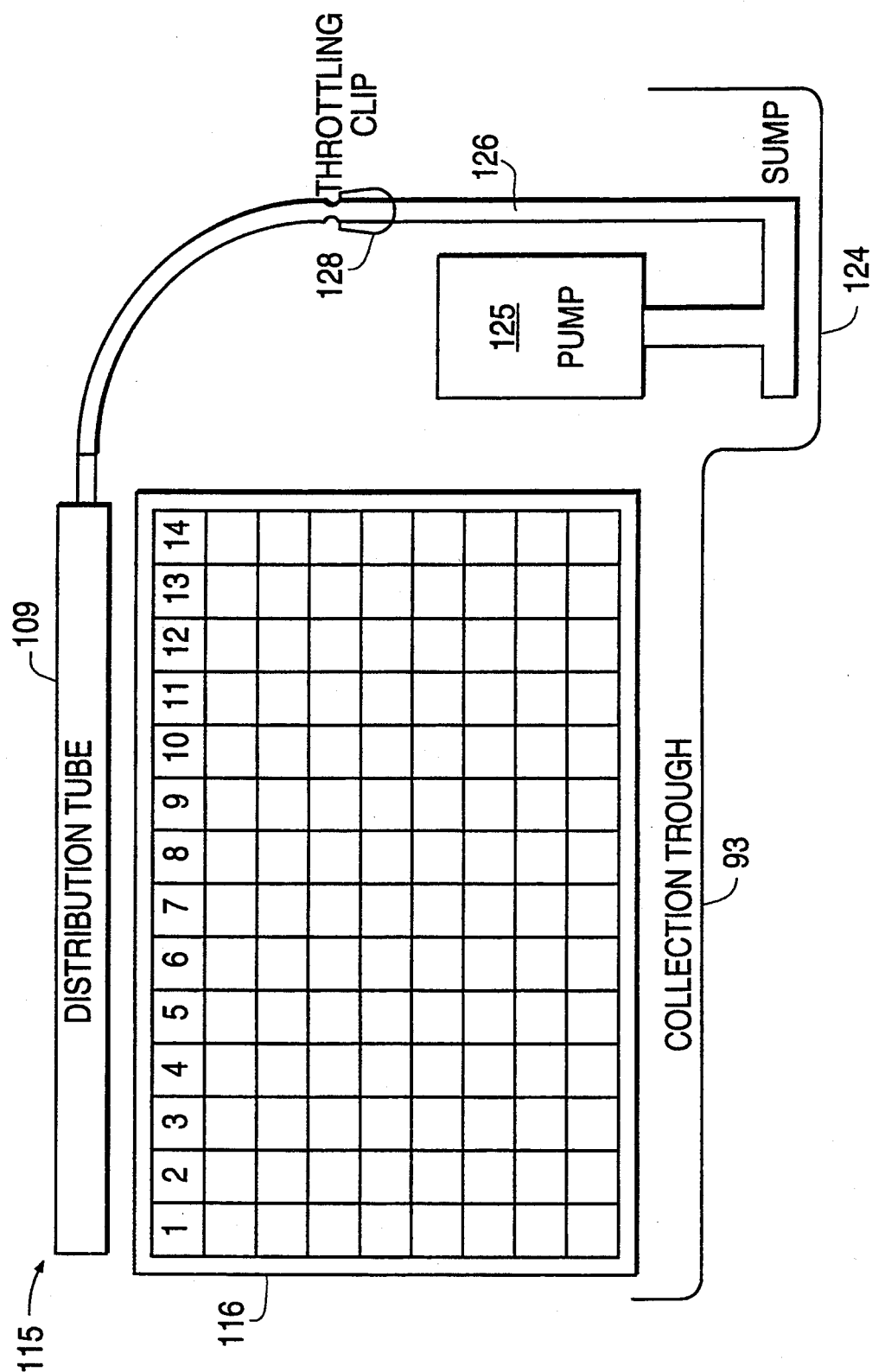
Figure 12:
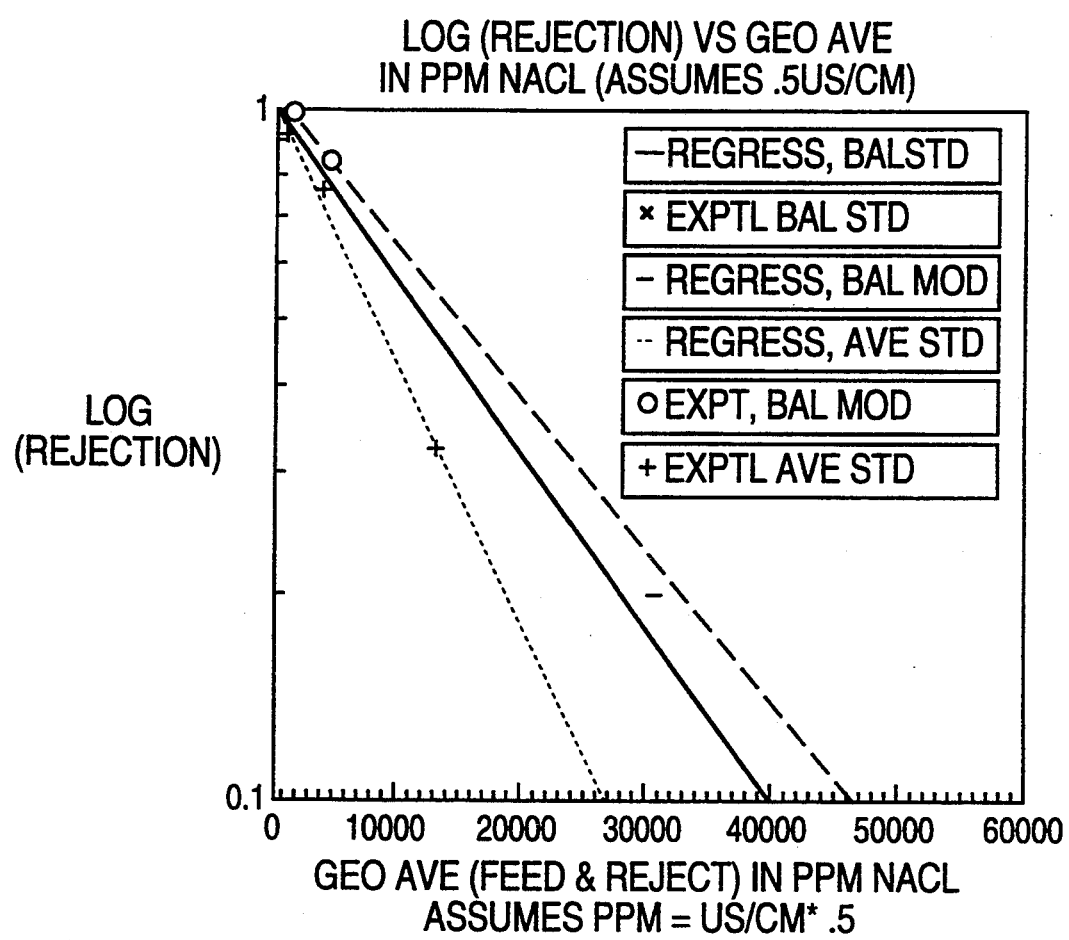
Figure 13:
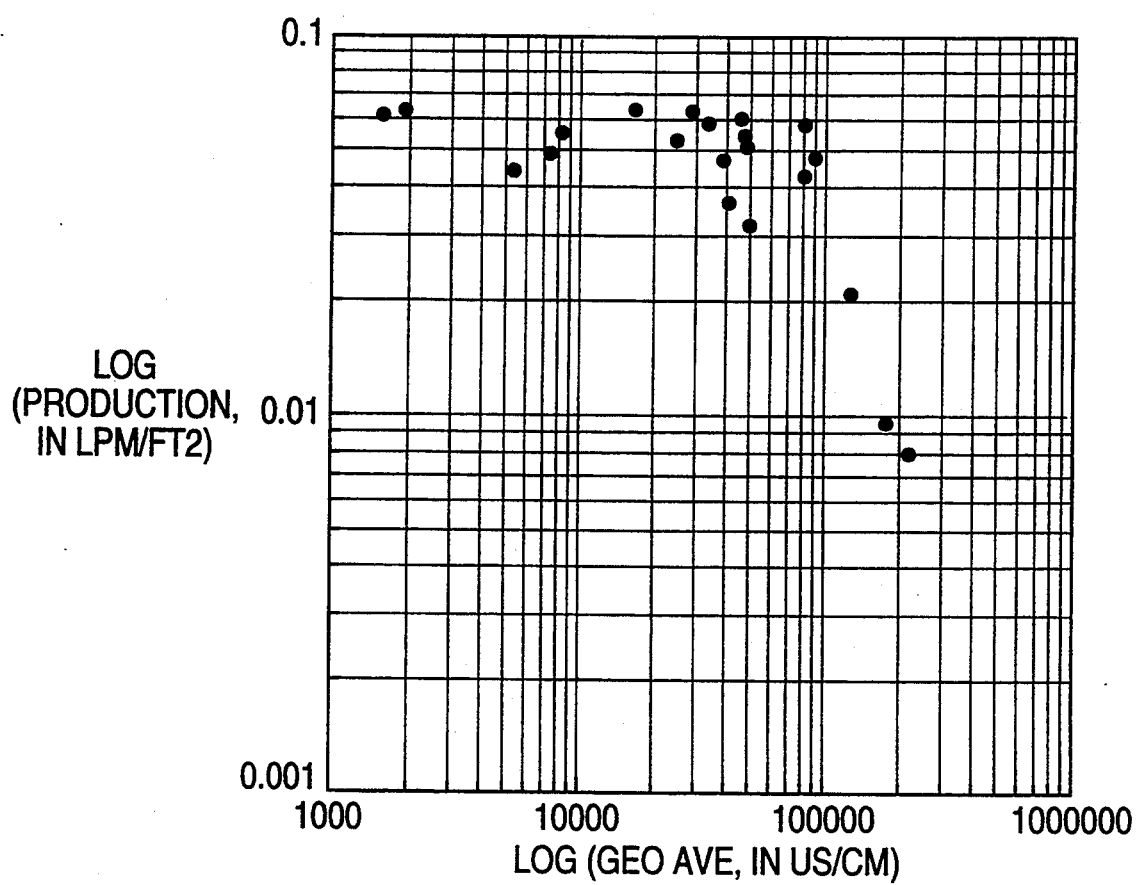
Figure 14:
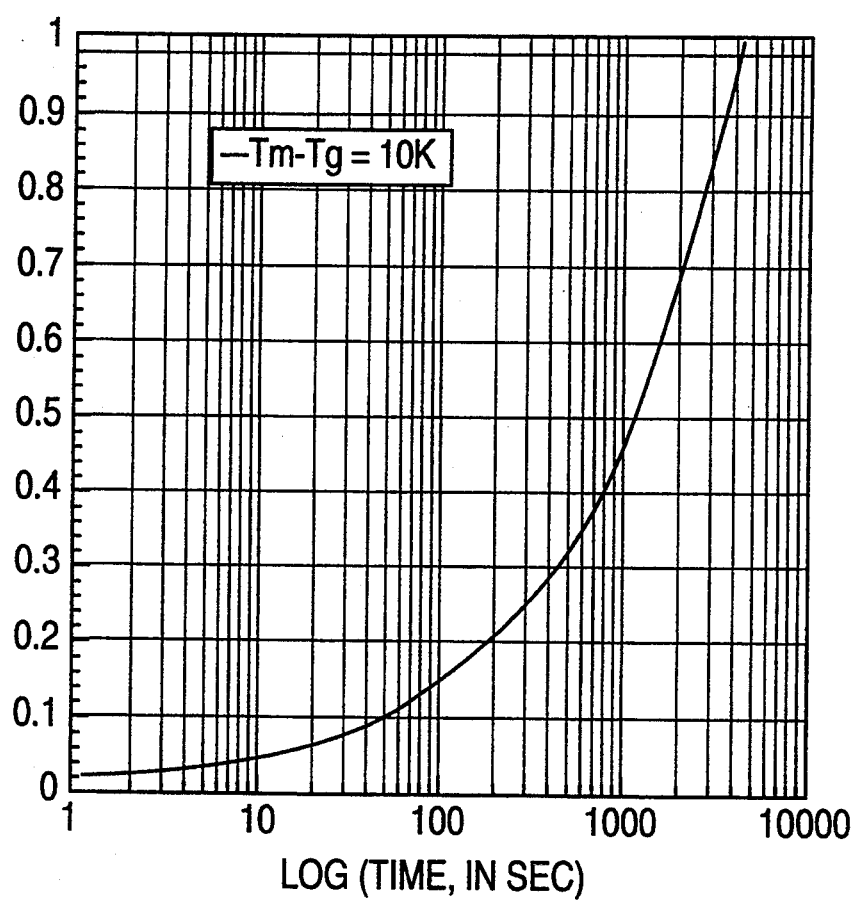
Figure 15:
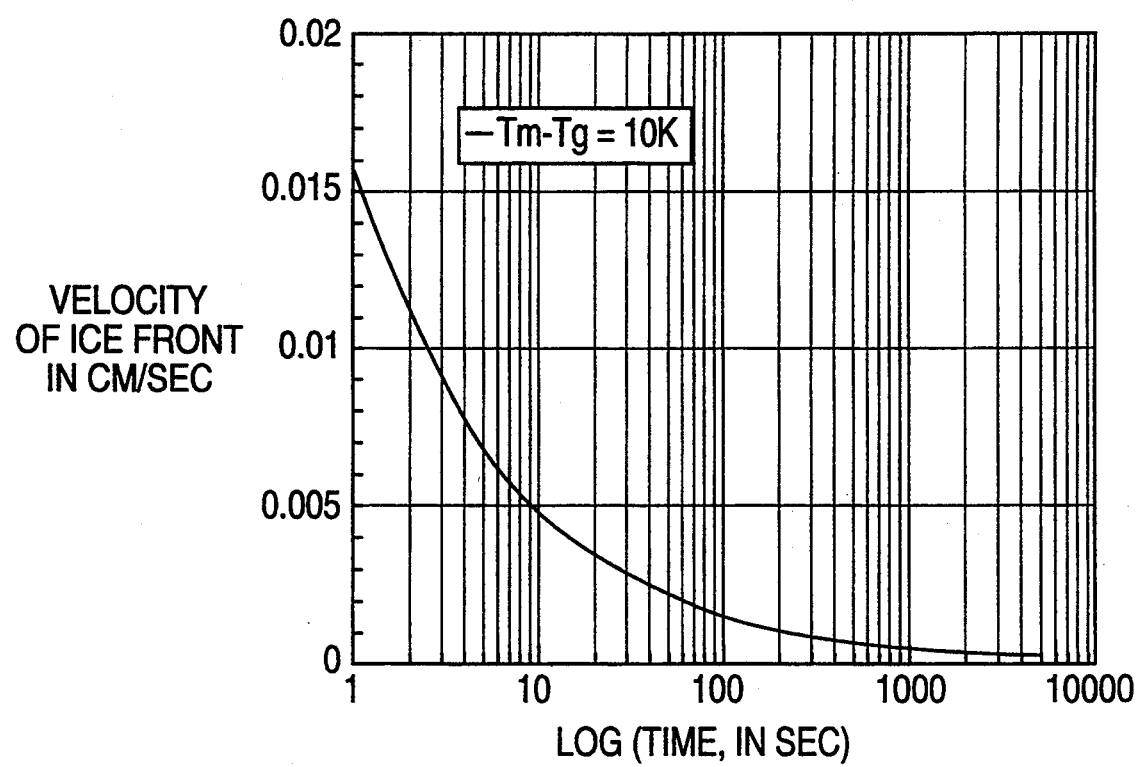
Figure 16:
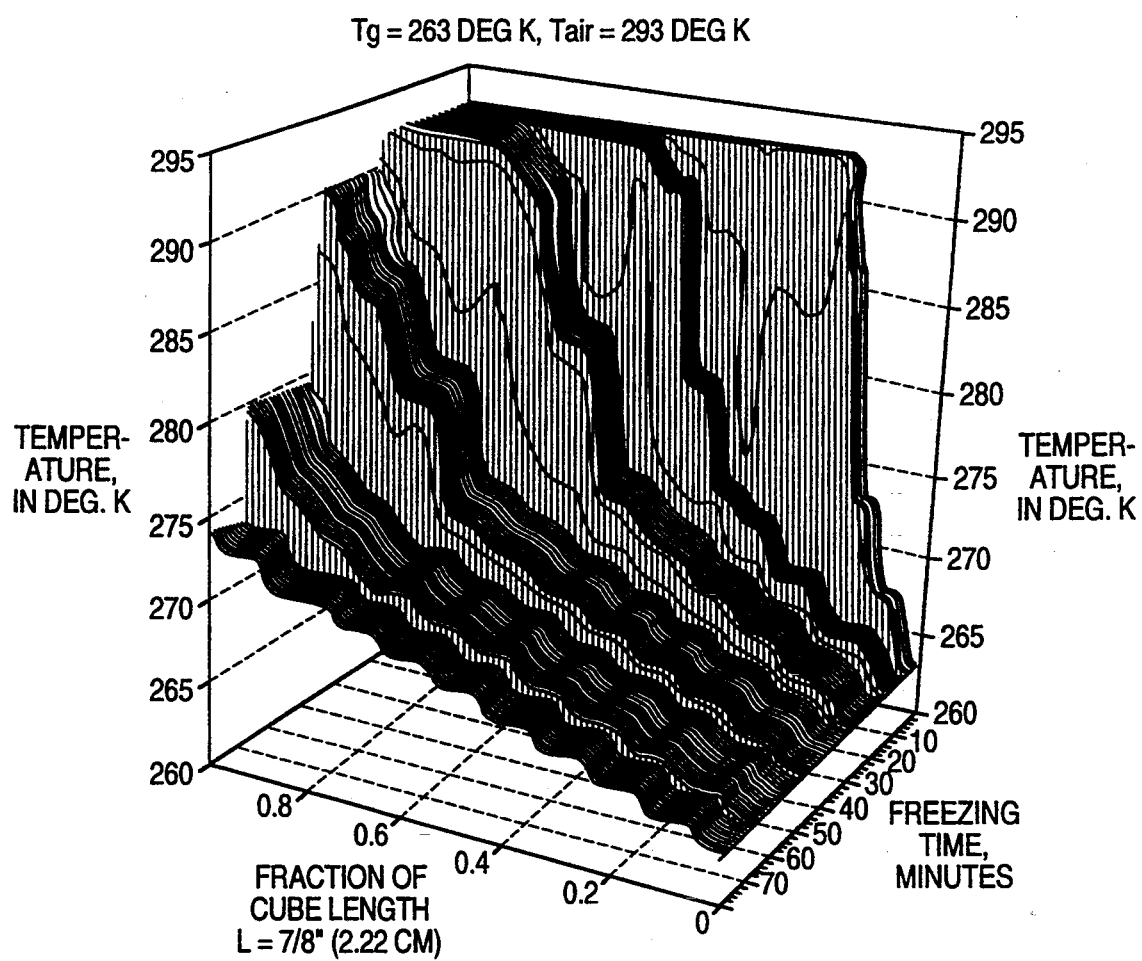

FIG. 6, 7, 8, and 9 are schematic-hydraulic diagrams of one of the freezer units of the freezer assembly of the system, illustrating how feed solution is first continuously sprayed and recirculated into the grid in order grow the ice solids, how pure rinse water is used to wash impurities off the surfaces of these solids prior to harvesting, as well how the ice is harvested, respectively;

FIG. 10A is a side schematic view of a vertically oriented ice grid configuration in an alternative embodiment of the system of the invention, illustrating the discontinuous flow of raw water along the various heat exchanger plates of this grid;

FIG. 10B is a side schematic view of a vertically oriented ice grid that has been modified with additional heat exchange plates so that raw water flows over the cavities defined by these plates in a continuous, uninterrupted sheet;

FIG. 11 is a schematic diagram of the alternative embodiment of the system that employs the vertically-oriented ice grid illustrated in FIG. 10B;

FIG. 12 is a graph illustrating the logarithm of the rejection rate of the purified water on one axis and the geometric average of the thermal feed water and reject water, illustrating in particular how improvement in the rejection rate is realized when a modified, vertically oriented grid (such as shown in FIG. 10B) is used versus an unmodified grid (such as shown in FIG. 10A);

FIG. 13 is a graph illustrating a logarithmic plot of the production of purified water and liters per minute per square foot versus the geometric average of the electrical conductivity of the feed and reject water in $\mu S/cm$;

FIG. 14 is a graph illustrating the behavior of the ice front movement as a fraction of edge length of the grid cavity (wherein $L = \frac{7}{8}$ inches $= 2.225$ cm) over the logarithm of time, in seconds;

FIG. 15 is a graph illustrating a plot of the velocity of the ice front as it freezes within the grid as a function of time for a 10° Kelvin difference between the melt temperature (Tm) of the ice solids and the grid temperature (Tg), and FIG. 16 is a three dimensional graph illustrating the relationship between temperature change and the fraction of cube length for a variety of different freezing times.

DETAILED DESCRIPTION OF THE PREFERRED EMBODIMENT

Figure 1:
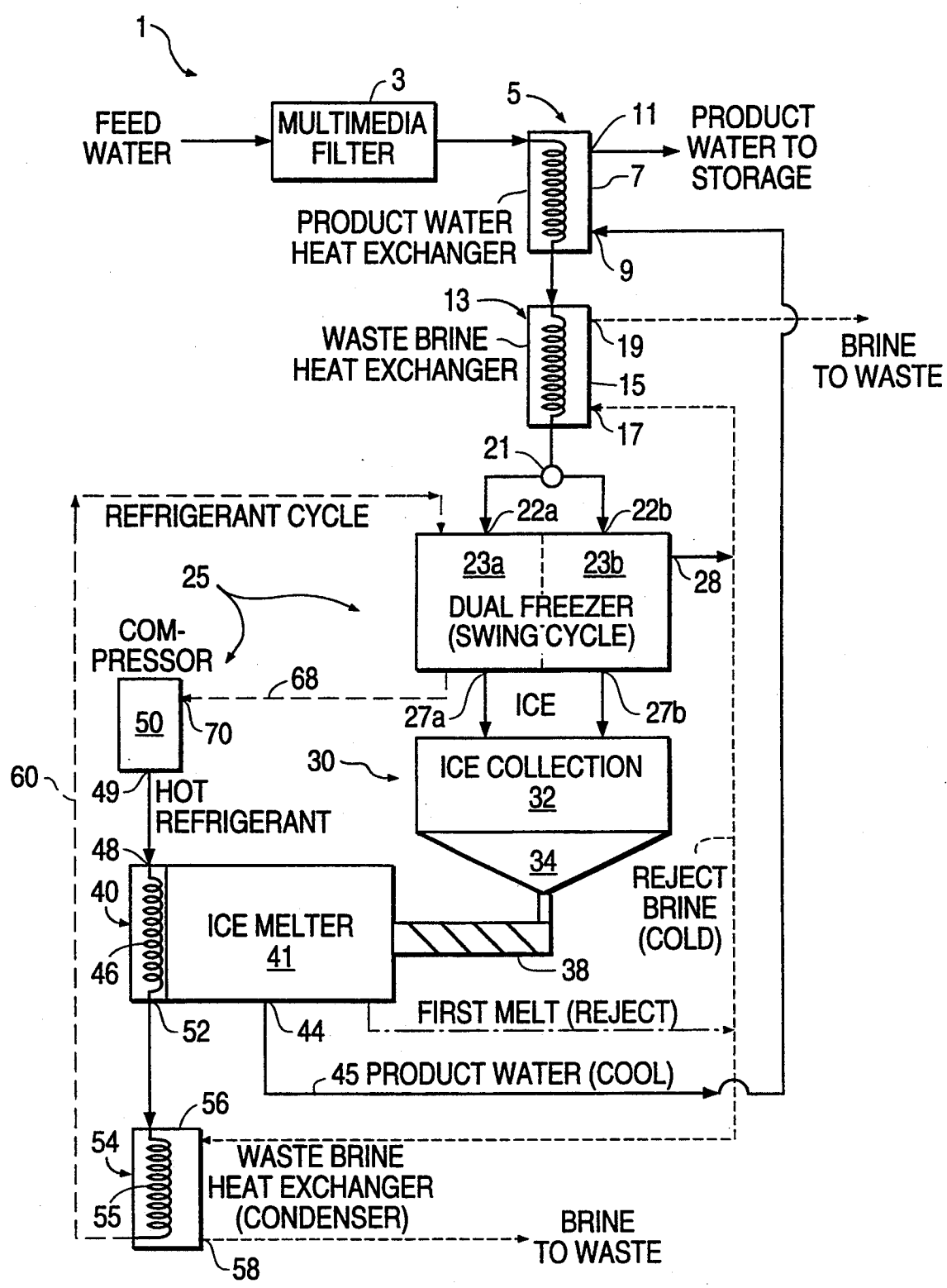
FIG. 1 is a block diagram of the freezing purification system of the invention, illustrating how raw water, purified water, and refrigerant flow through the various components of the system.

With reference now to FIG. 1, wherein the same reference numerals designate like components throughout out the several figures, the freezing purification system 1 of the invention comprises a multimedia filter bank 3 for receiving raw feed water and removing substantially all of the particulate contaminants entrained therein. To this end, the filter bank 3 may include a series of screen filters (not shown) of various degrees of coarseness for removing relatively large debris (such as leaves and other such organic matter) from the water, as well as a bank of removable cartridge-type filters for removing coarse particulate matter (such as sand) down to the very fine particulate matter having diameters on the order of, for example, 5 microns. Downsteam of the multimedia filter bank 3 are a pair of serially connected heat exchangers 5 and 13 whose purpose is to cool the filtered feed water to below ambient temperature in order to reduce the amount of work that the freezer assembly 25 must perform in order to freeze the raw water. The first of these heat exchangers is the product water heat exchanger 5, which includes a housing 7 for enveloping a coiled conduit which conducts the raw water as well as a coolant inlet 9 and coolant outlet 11. The coolant inlet 9 receives purified water that has just been produced from melted ice, and whose temperature is therefore substantially below ambient room temperature. After flowing through the housing 7 in intimate thermal contact with the coiled heat conductive, conduit transporting the filtered raw water, the cool water product exits the housing 7 through outlet 11 where it is routed to a product water storage tank (not shown). After exiting the product water heat exchanger 5 through the coiled conduit, the cooled, filtered raw water enters the waste brine heat exchanger 13. Like heat exchanger 5, heat exchanger 13 likewise includes a housing 15 for containing a coiled heat conductive conduit for transporting the raw water, as well as a coolant inlet 17 and coolant outlet 19. The coolant inlet 17 receives feed solution that has been circulated through the freezer assembly 25 but which was not frozen during such circulation. Because of its contact with the heat exchange surfaces of the ice grid within the freezer assembly, the temperature of such rejected feed solution is again well below ambient room temperature. Consequently, the thermal contact that occurs between the waste brine flowing through the housing 15 of the heat exchanger 13 and the filtered raw water flowing through the coiled conduit in the housing 15 reduces the temperature of the raw water even further.

After exiting the waste brine heat exchanger 13, the flow of cooled and filtered raw water is split into two parallel flows which enter the inlets 22a,b of two freezer units 23a,b included within the freezer assembly 25. As will be described in more detail hereinafter, the cooled, filtered raw water is converted into ice solids by the ice grids of each of the freezer units 23a,b which operate in a swing cycle (wherein ice from one grid is harvested while ice from the other grid is being formed) to maximize the time efficiency of the system 1. The resulting ice is formed from the pure water component of the raw water, and the exterior surfaces of the ice solids created in the grids of the freezer units 23a,b are timed to remove any surface contaminants deposited thereon before the ice is released from the ice grids during the harvesting operation. The harvested ice solids exit the freezer assembly 25 through the outlets 27a,b, while the rejected, unfrozen raw water (which is sometimes referred to as "brine" in this application, even in instances where the raw water does not contain substantial amounts of dissolved sodium chloride) is expelled out of the freezer assembly 25 through brine outlet 28 and routed to the coolant inlet 17 of the heat exchanger 13 in the manner previously described.

The ice solids that leave the freezer assembly 25 through the outlets 27a,b are dropped into an ice collection assembly 30 having a bin 32 for receiving the ice solids and a funnel 34 for directing these solids into a screw conveyor 38. The screw conveyor 38 in turn transports these ice solids into an ice melting assembly having a housing 41 for holding the ice solids, and a purified water outlet 44 for draining the product water of the system into a conduit 45 which conveys the relatively cool product water into the coolant inlet 9 of the heat exchanger 5 for the purposes previously discussed. The ice melting assembly 40 further includes a heat exchanger 46 which conducts the heat necessary to melt the ice solids from hot refrigerant that enters the inlet 48 of the heat exchanger 46 from the refrigerant outlet 49 of the refrigerant compressor 50.

With reference again to FIG. 1, and with further reference to FIG. 2, the flow path of the refrigerant used in this system will now be described. After warming the ice contained in the housing 41 of the ice melter assembly 40, the refrigerant leaves the heat exchanger 46 through the outlet 52 at a lower temperature. The temperature of the exiting refrigerant is lowered further by a condenser 54 having a housing 55 which envelopes a coiled, heat conducting conduit that carries the refrigerant. Like heat exchangers 5 and 13, the housing 55 of the condenser 54 includes a coolant inlet 56 and coolant outlet 58. The coolant inlet 56 receives rejected raw water solution or brine exiting the brine outlet 28 of the freezer assembly 25. Because this rejected raw water solution has been in intimate contact with the ice forming grids of the freezer units 23a,b of the freezer assembly 25, its temperature is well below ambient room temperature. After this rejected raw water solution has circulated through the housing 55, it exits through the coolant outlet 58 where it is disposed of as waste. In the meantime, the doubly-cooled refrigerant is now circulated back up into the freezer units 23a,b of the freezer assembly 25 through the refrigeration return conduit 60, where it is expanded into a gaseous phase via expansion valve 55 into an evaporator 67 (shown in FIG. 2). The evaporator 67 is in intimate thermal contact with the ice forming grids of the freezer units 23a,b, and lowers the temperatures of these grids to below the freezing point of the raw water solution being sprayed thereon. Thereafter, the refrigerant exits the freezer units 23a,b through a refrigerant drain conduit 68 which terminates in a refrigerant storage tank 69. From this tank the refrigerant finally enters the refrigerant inlet 70 of the compressor 50.

Figure 2:
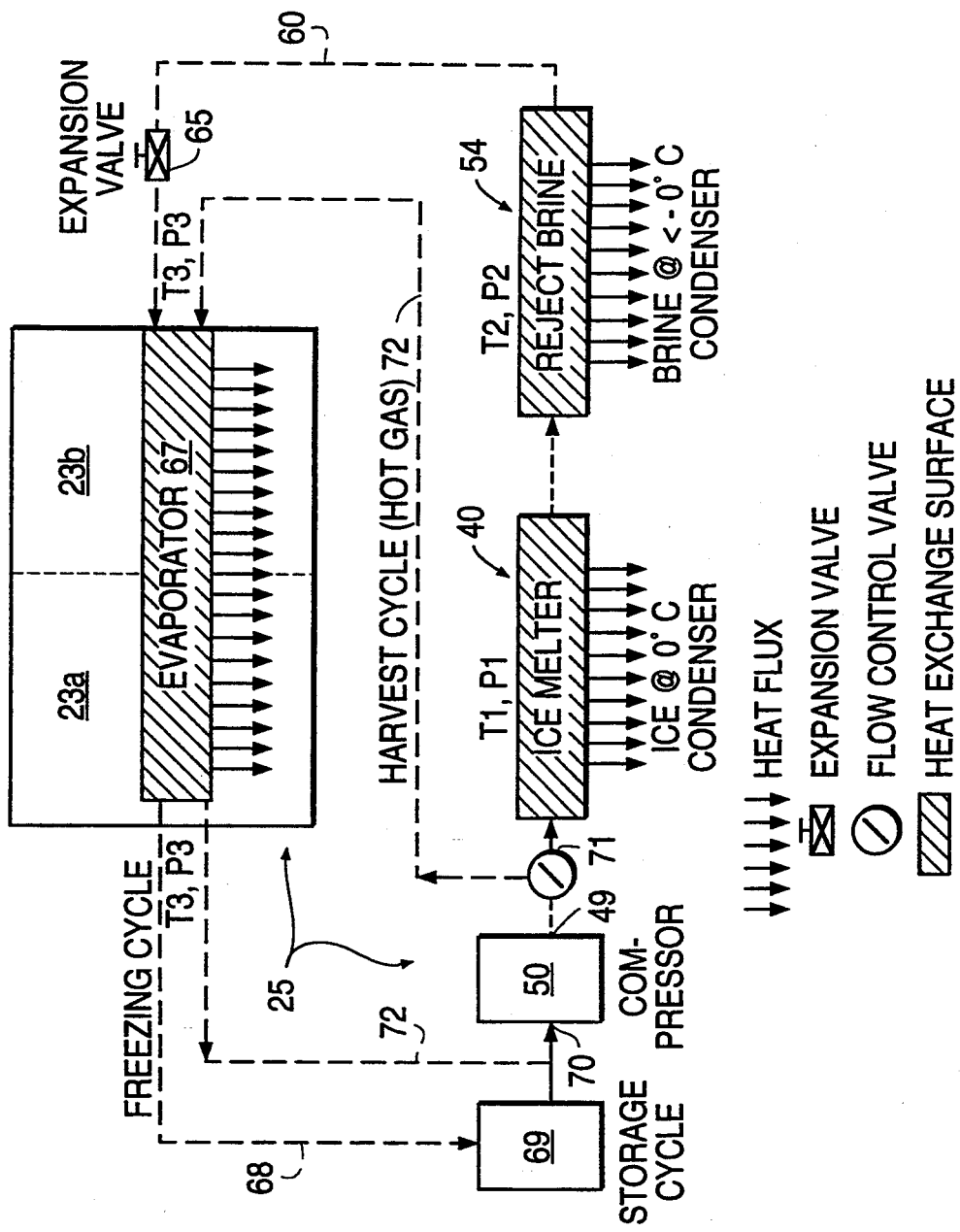
FIG. 2 is a block diagram illustrating the flow path of the refrigerant through the freezer units, the compressor, the ice melter and the condenser of the system.

FIG. 2 illustrates an alternate path taken by the hot refrigerant produced at the outlet 49 of the compressor 50 during the harvest cycle of the freezer units 23a,b. Specifically, this hot refrigerant can be directed via two way valve 71 into a conduit 72 which is likewise connected to the evaporator 67, but which bypasses the ice melter 40, the condenser 54, and most importantly the expansion valve 65. Accordingly, the refrigerant which flows through the conduit 72 is hotter than the melting point of the ice solids created in the grids of the freezer units 23a,b. Consequently, when the two way valve 71 is turned so as to divert the hot refrigerant to the conduit 72, the heat exchange surfaces of the grids of the freezer units 23a,b actually melt the ice solid lodged within them just enough to cause the solids to fall out of their respective grids.

Figure 3:
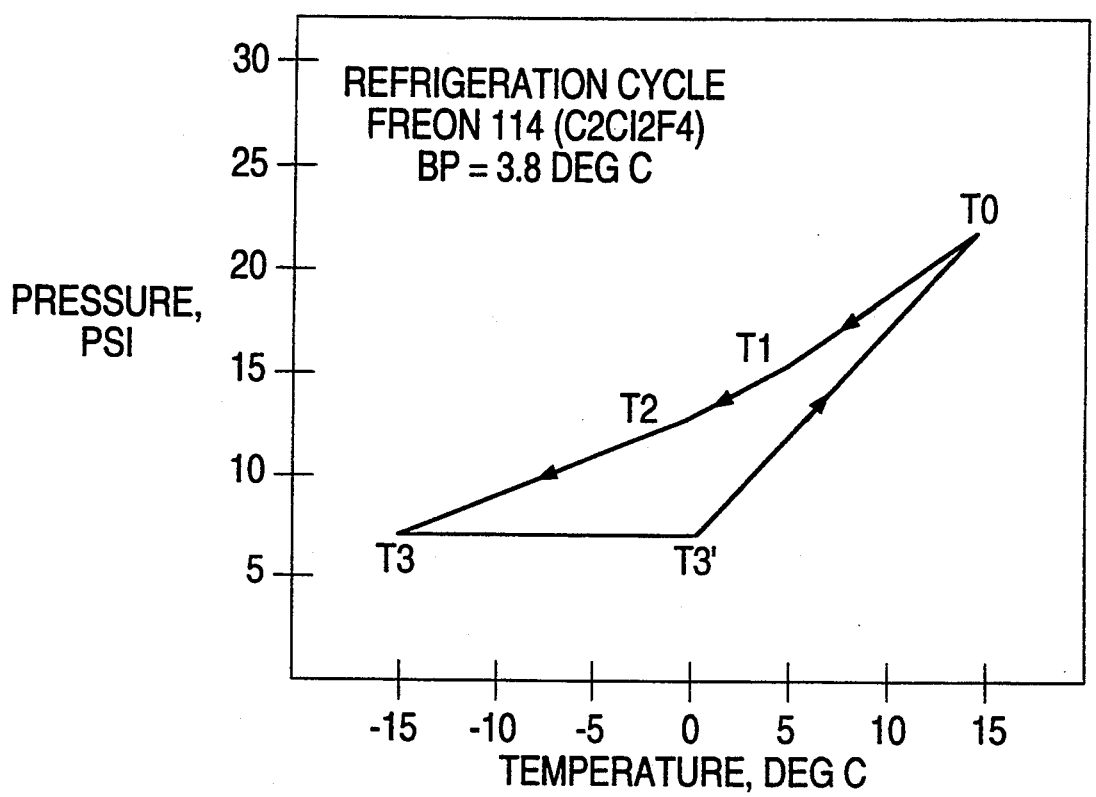
FIG. 3 is a graph of the temperature and pressure cycle of the refrigerant as it circulates between the various elements of the system illustrated in FIG. 2.

FIG. 3 illustrates the pressure and temperature cycle of the refrigerant used in the system 1 as it travels from the compressor 50, the ice melter 40, the condenser 54 and on through the expansion valve 65 and through the freezer units 23a,b. As is evident from the area contained within the resulting triangular curve, the recovery of heat from the hot refrigerant existing the compressor 50 in combination with the transfer of heat from the raw water fed into the freezer units 23a,b to the reject raw water solution creates multiple thermal efficiencies in the system 1, allowing it to produce a maximum amount of pure water with a minimum amount of energy input.

Figure 4:
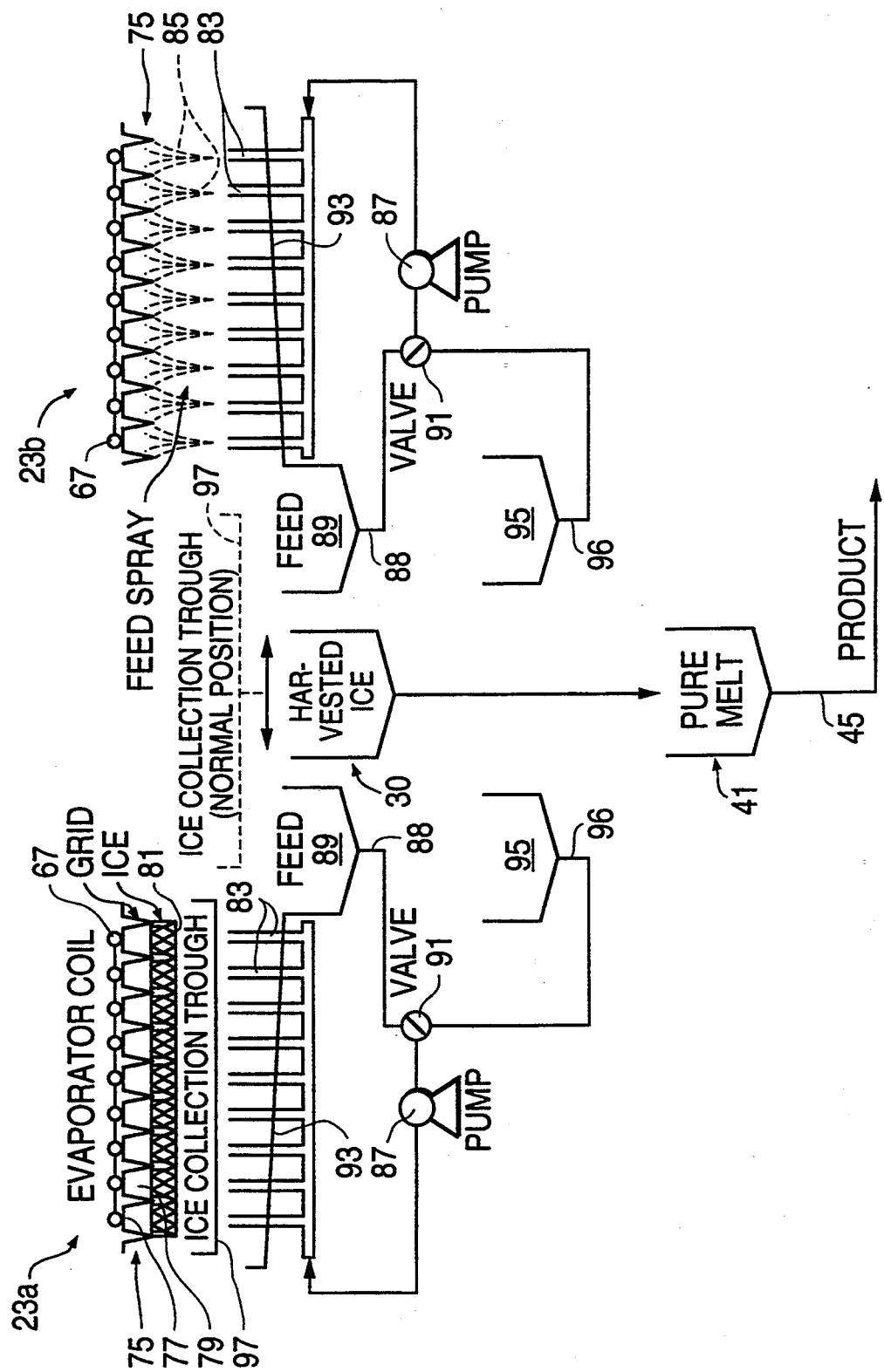
FIG. 4 is a schematic drawing of the dual freezer units which make up the freezer assembly of the system, illustrating how raw feed water is sprayed up into the inverted cavities of the two freezer units, and how the unfrozen feed water is circulated back into a feed solution tank.

With reference now to FIG. 4, the freezer units 23a,b of the freezer assembly 25, each include an ice grid 75 having a plurality of heat exchange plates 77 for defining prism shaped cavities 79. In the preferred embodiment of the system 1, the ice grids 75 of each of the freezer units 23a,b is horizontally oriented so that each of the prism-shaped cavities 79 therein is inverted as shown. As is shown with respect to freezer unit 23a, the ice grid 75 of each of the freezer units ultimately creates four-sided, prism-shaped ice solids 81 at the termination of the freezing cycle. As is shown with respect to freezer unit 23b, each of the freezer units includes a plurality of feed water spray nozzles 83 for producing a vertically oriented feed spray 85 within the cavity 79 defined by the heat exchange plates 77 of the ice grid 75. A constant supply of feed water is forcibly pumped into the feed water spray nozzles 83 by means of a pump 87 during the freezing cycle. The constant feed spray 85 provided by the feed water nozzles during the freezing cycle, in combination with the drainage of the feed water provided the inverted orientation of the prism-shaped cavity 79 provides a constant, sheet like flow of raw feed water over the heat exchange plates 77 during the freezing operation which allows the contaminants expelled at the surface of the continuously growing ice within the cavities 79 to be effectively and continuously washed away. This in turn prevents these expelled contaminants from becoming re-entrapped back into the ice solids 81 created by the grid 75 of each of the freezer units 23a,b.

Raw feed solution is continuously provided to the pump 87 through the outlet 88 of a feed solution tank 89. The flow of feed solution from the tank 89 to the inlet of the pump 87 is regulated by a two way valve 91. A collection tray 93 is provided beneath the feed water spray nozzles to collect the unfrozen, raw feed solution which drains out from the cavity 79 of the grid 75, and to return it back into the feed solution tank 79 for recirculation. Further included in each of the freezer units 23a,b is a rinse solution tank 95 for providing me solution to the pump 87 which is in turn sprayed over the top surface of the ice created within the cavity 79 of the ice grid 75 at the termination of the freezing cycle. In the preferred embodiment, the rime solution contained within the tank 95 is distilled water. At the termination of the freezing cycle, the spraying of pure water over the upper surfaces of the ice solids 81 created within the ice grid 75 effectively washes away contaminants expelled by the ice solids during their formation so that the resulting ice solids 81 are formed entirely of purified water. The two way valve 91 effectively disconnects the inlet of the pump 87 from the feed solution tank 89 and connects it to the outlet 96 of the rinse solution tank 95 at the end of the freezing operation.

With reference now to both FIGS. 4 and 5A, 5B, 5C, the freezer assembly 25 further includes an ice collection trough 97 for alternately receiving ice harvested from the grid 75 of the freezer unit 23a and the grid 75 of the freezer 23b. To this end, the ice collection trough 97 is reciprocally movable from a middle position (as shown in phantom in FIG. 4), to the left and right positions illustrated in phantom in FIG. 5A. The ice collection trough 97 has a broad, vee-shaped profile and cross section as indicated in FIGS. 5A and 5B. The flanges forming its vee-shaped walls terminate in u-shaped portions which are slidably mounted on a straight lateral support bar 98a and a curved lateral support bar 98b. When the trough 97 is slid laterally to either of the phantom positions illustrated in FIG. 5A, the curvature of the bottommost support bar 98b causes the trough 97 to assume the harvest position illustrated in FIG. 5B which is capable of effectively receiving and holding ice harvested from the grid 75 of the freezer units 23a,b. When the trough is moved back into the center position illustrated in FIG. 5A, the curvature of the bottom support bar 98b causes the trough 97 to assume the dump position illustrated in FIG. 5C, wherein ice solids 81 are effectively dumped out of the trough 97 through outlets 27a,b and ultimately into the ice collection assembly 30.

FIGS. 6 through 9 generally illustrate the method of the invention implemented by each of the freezer units 23a,b. In the first step of this method, the control valve 91 is turned so that the recirculation pump 87 receives raw feed solution 99 from the feed solution tank 89. This raw feed water 99 is vertically sprayed through nozzles 83 into the inverted cavities 79 of the ice grid 75. As the heat exchange plates 77 which form the cavity 79 have been cooled to a temperature which is less than the freezing point of the raw water solution, ice begins to incrementally build upon the surfaces of the heat exchange plates 77. As this ice incrementally grows, contaminants dissolved in the raw feed water are displaced out of the resulting ice as the water crystallizes. These contaminants are driven out on to the upper surfaces of the growing ice solid 81 where they are washed away by the constant circulation of raw water being sprayed out of the nozzles 83. To insure that the contaminants will have sufficient time to become displaced and rinsed away from the ice growing in the grid 75, the temperature of the heat exchange plate 77 is adjusted so that the cavities 79 defined in the grid 75 will not become filled with ice solids 81 until sometime between about 15 and 35 minutes, and preferably between 20 and 30 minutes.

After the ice solids 81 have grown to the extent to where they completely fill the cavity 79 of the ice grid 75, the rinsing step of the method of the invention commences which is illustrated in FIG. 7. In this step of the method of the invention, the two way valve 91 is turned to shut off the flow of raw feed water 99 from the pump 87, and to place the inlet of this pump 87 in communication with the outlet 96 of rinse water 100 contained in the rime water tank 95. The rinse water 100 is distilled or otherwise purified water, and when this water is sprayed over the upper surfaces of the ice solids 81 through the nozzles 83, it washes off any remaining contaminants that may be present on the upper surface of the solids 81. The rinse water which drains back into the collection tray 93, in combination with the contaminants washed away, are routed back into the feed solution tank 89 by the tray 93.

Figure 8:
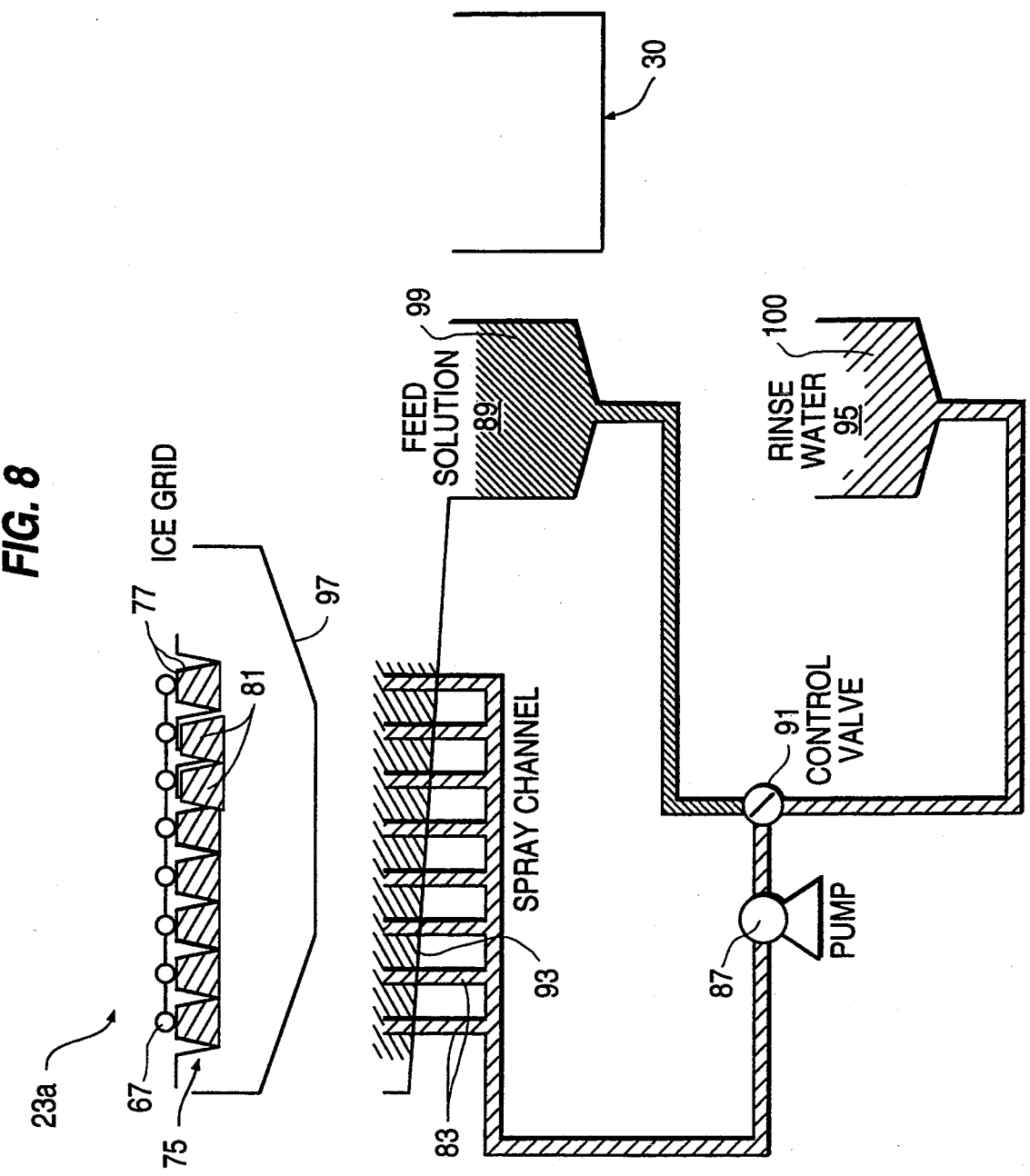

FIG. 8 illustrates the next step of the method of the invention, wherein the ice collection trough 97 is placed under the ice grid 75 as shown. Hot refrigerant is then diverted through the evaporator 67 through the two way valve 71 illustrated in FIG. 2. This causes a sufficient enough melting of the ice interfacing with the heat exchange plate 77 of the grid 75 to cause the ice solids 81 to fall from their respective, prism-shaped cavity 79 into the trough 97. In the next step of the method, the ice trough 97 is slid over the ice collection assembly 30 and dumped therein, as is illustrated in FIG. 9. In the subsequent steps of the method, the rinsed ice solids 81 are conveyed into the ice melter 40, and melted into product water as is described earlier in the context of FIG. 1.

FIGS. 10A and 10B illustrate alternate embodiments 105 and 115 of the grid structures which may be used in conjunction with the freezer units 23a,b of the system 1. Specifically, as shown in FIG. 10A, the horizontally oriented ice grid 75 may be replaced with a vertically oriented ice grid 107. Further, the feed water spray nozzles 83 may be replaced by a raw water distribution pipe 109 having a plurality of openings 110 for distributing a sheet like flow of raw water over the topmost row of cavities 110.5. In this alternative grid embodiment 105, the heat exchange plates 111 are arranged to define solids which approximate rectangular prisms or cubes 113. Unfortunately, while this alternate embodiment 105 of the grid structure is intended to be encompassed within the scope of this invention, the inventor has found that one of the shortcomings associated with it is the presence of discontinuous flow areas 114 which are present under each of the heat exchange plates 111. These discontinuous flow areas interfere with the washing away of gaseous and liquid contaminants expelled from the ice solids formed in the grid 107, and which in turn impairs the purity of the resulting product water of the system 1.

The alternate grid structure 115 illustrated in FIG. 10B eliminates the problem of discontinuous flow associated with the alternate embodiment 105 illustrated in FIG. 10A. In this alternate structure 115, the vertically oriented ice grid 116 is provided with extra heat exchange plates 117 between the heat exchange plates 111 which generally define rectangular or cubic prisms, such that cavities shaped like triangular prisms 119 are defined between the heat exchange plates 111 and 117. Such reshaping of the cavities into triangular prisms 119 causes the raw water to uniformly flow over the surfaces of heat exchange plates 111, 117 in an unbroken sheet throughout all of the triangular prism cavities 119 such that any liquid or gaseous contaminants frozen out of the ice solids created in these cavities 119 will be thoroughly washed away in much the same manner as is the case with the horizontally oriented grid configuration illustrated in FIGS. 4 through 9.

FIG. 11 illustrates a structural implementation of the alternate grid structure 115 illustrated in FIG. 10B. In this alternate embodiment of the system 1, a collection tray 93 which is integrally formed into a sump 124 is placed beneath the modified, vertically oriented grid 116. Additionally, the previously discussed pump 87 present in the first embodiment of the system is replaced with a sump pump 125 as shown. A flexible conduit 126 conducts the water recirculated by the sump pump 125 back into the distribution pipe 109. The rate of flow of water through the distribution pipe 109 and down into the grid 160 may be controlled by a throttling clip 128 which engages the side walls of the flexible tubing 126. The freezer units 23a,b may each be comprised largely of a commercial ice machine, such as a Manitowoc Model E0200 water cooled ice machine, manufactured by Manitowoc Equipment Works, a division of the Manitowoc Company, Inc., located in Manitowoc, Wis.

FIG. 12 is a graph which illustrates how the rejection rate of water is improved in the system when a modified grid such as that shown in FIG. 10B is used in lieu of a conventional, cubic style grid as shown in FIG. 10A. The ordinate of the graph of FIG. 12 is the logarithm of the rate of rejection, while the abscissa is the geometric average (or logarithmic mean) of the concentration of contaminants which in this case is parts per million of sodium chloride. In this graph, the geometric average is computed by taking the square root of the product of the initial volume of feed water that is poured over the grid times the volume of the feed water that is rejected (i.e., not frozen) by the grid, while the logarithm of the rejection is computed by dividing the volume of the ice product produced in the grid by the geometric average of the feed water and rejected water, and subtracting the resulting fraction from one. The solid and dashed lines represent experimental results obtained with feed water contaminanted with sodium chloride for both the unmodified grid illustrated in FIG. 10A, and the modified, triangular cavity grid illustrated in FIG. 10B, while the dotted line in the graph illustrates the results obtained for the total ice product (i.e., unrinsed ice having contaminants on its surface) when a standard cubic grid such as that illustrated in FIG. 10A is used. The following table illustrates the salt concentration in the raw water used for the various data points that the three graphs of FIG. 12 represent extrapolations of:

graph illustrates that the velocity changes quickly with time until about 600 seconds, after which the velocity changes insignificant. Because contaminants can become entrapped in the resulting ice if the velocity of the ice front becomes to high, this graph (which was taken under circumstances where the heat exchange surfaces of the ice grid steadily remained 10° Kelvin below the freezing point of the raw feed water) suggests that the temperature of the heat exchange surfaces of the ice

| EXPERIMENT DATE | FEED* | REJECT* | STANDARD FIRST MELT PRODUCT* | STANDARD GRID BALANCE PRODUCT* | MODIFIED FIRST MELT PRODUCT* | MODIFIED GRID BALANCE PRODUCT* | REJECTION+ PERCENT STD-BAL | REJECTION+ PERCENT MCO-BAL |
|---|---|---|---|---|---|---|---|---|
| 7-09-91 | 11,000 | 14,400 | 8,500 | — | — | — | 32.5** | — |
| 7-15-91 | 2,150 | 6,000 | 850 | — | — | — | 76.3** | — |
| 10-31-91 | 550 | 1,195 | 130 | 60 | 30 | 15 | 92.6 | 98.2 |
| 12-03-91 | 2,900 | 5,600 | 1,350 | 850 | 1,050 | 625 | 78.9 | 84.5 |
| 12-05-91 | 800 | 1,590 | 208 | 38 | 50 | 9 | 96.7 | 99.2 |

*TDS, ppm
+Based on the geometric average of the feed and reject concentrations and the concentration for the balance of the product water after the first melt is removed.
**Total melt rather than balance.

As can be seen in FIG. 12, the rejection rate for the triangular-cavity grid illustrated in FIG. 10B is substantially lower than the rejection rate associated with the cubic grid illustrated in 10A over the entire range of the geometric average of feed water and rejected water. Additionally, the rejection rate is much higher for the total ice produced illustrated in the dotted line, which indicates that the contaminants removed by the process accumulate on the outer surface of the ice product and should be washed off before the product ice is melted into the resulting product water. Finally, the graph illustrates how the rejection rate generally falls under all conditions as the volume of feed water and rejected water increases.

FIG. 13 illustrates a logarithmic plot of the production of purified ice from the grid of a system 1 in terms of LPM per foot squared of grid area, (for each of the grids 116 is assumed to have an area of approximately 0.79 foot squared) versus the geometric average of the electrical conductivity of the feed water and the rejected water in $\mu S/cm$, wherein conductivity is generally indicative of the presence of unremoved contaminants. This graph illustrates that the production rate is independent of the conductivity of the feed water up to about 100,000 $\mu S/cm$, wherein the production changes sharply with the conductivity of the feed water.

FIG. 14 is a graph that illustrates the behavior of the front of the ice that incrementally grows within the grid of the system as a function of time. In plotting this graph, the temperature of the grid was held to be 10° Kelvin lower than the freezing temperature of the feed water. Additionally, the edge length of one of the grid cavities was approximately 2.2225 cm. As is evident from the graph, the ice grows very quickly after approximately 100 seconds of freezing time. This graph further illustrates that the ice front has traversed about 75 percent of the length L of the grid cavities in about 20 minutes, and that the use of a multiple surface grid (whether cubic or prismatic) accelerates ice formation compared to the formation of ice on a flat surface, since the ice front approaches the edge length L from different directions. When a four surface cavity is used (which would be the case when the first embodiment of the system 1 is used) this graph illustrates that grid cavities will be filled with ice in about 21 minutes.

FIG. 15 illustrates the velocity of the ice front and ice grid of the system as a function of time. Generally, this grid should steadily become cooler as the ice builds up in the grid in order to achieve a flatter and more linear ice front velocity curve.

Finally, FIG. 16 is a three dimensional plot of the fraction of cube length versus freezing time and minutes for various temperatures in the range from the grid temperature $T_g = 263°$ Kelvin to the air temperature $T_a = 293°$ Kelvin. The ice formation is represented by the portion of the graph below $T = 275°$ Kelvin. At higher temperature, the cold water front is high at the beginning and decreases with time.

We claim:

1. A system for purifying raw water having contaminants dissolved therein, comprising
   an ice grid having heat exchange surfaces for producing ice solids having a surface to volume ratio no greater than 25 to 1;
   means for indirectly cooling the heat exchange surfaces of the ice grid to a temperature that is less than at least the freezing point of the raw water, and
   means for continuously flowing raw water over the cavities of said ice grid such that ice solids formed from substantially pure water incrementally build up from the heat exchange surfaces of said grid to ultimately fill said cavities while unfrozen contaminants expelled from said incrementally freezing ice in the grid cavities are continuously washed away from said ice by said continuous raw water flow.

2. A system for purifying raw water as defined in claim 1, wherein said ice grid is oriented at an angle such that liquid water introduced into said grid cavities drains out of said cavities by gravity.

3. A system for purifying raw water as defined in claim 2, wherein said continuous flow means includes a means for continuously introducing a stream of raw water into said cavities of said ice grid.

4. A system for purifying raw water as defined in claim 3, wherein said ice grid is vertically oriented such that the cavities defined therein are vertically stacked with respect to one another, and said continuous flow means includes a conduit for introducing a stream of water into the uppermost of said stacked cavities.

5. A system for purifying raw water as defined in claim 4, wherein the heat exchanger surfaces define mutually contiguous convex prisms that facilitate a uniform flow rate of raw water over all portions of the heat exchange surfaces defining said cavities.

6. A system for purifying raw water as defined in claim 3, wherein said ice grid is horizontally oriented such that the cavities included therein are inverted, and wherein said continuous flow means includes a means for spraying raw water up into said inverted cavities.

7. A system for purifying raw water as defined in claim 2, further comprising means for collecting said drained raw water, and pump means for recirculating said drained raw water back into said continuous flow means.

8. A system for purifying raw water as defined in claim 1, further comprising a filter means for removing particulate material from said raw water before said continuous flow means introduces said water into said grid cavities.

9. A system for purifying raw water as defined in claim 1, further including means for collecting the ice solids formed from said ice grid: and means for rinsing said solids in said collection means with pure water.

10. A system for purifying raw water as defined in claim 1, further including means for melting the ice solids to create substantially purified water.

11. A system for purifying raw water as defined in claim 10, further comprising a refrigeration means having an evaporator for cooling the heat exchange surfaces of said ice grid, and a heat generating compressor that is thermally coupled to the ice melting means to recover said heat.

12. A system for purifying raw water as defined in claim 1, further comprising more than one ice grid, wherein one or more ice grids are being used to create said ice solids while the ice solids in another ice grid are being removed.

13. A system for purifying raw water having contaminants dissolved therein, comprising:
an ice grid having heat exchange surfaces for producing ice solids having a surface to volume ratio no greater than 25 to 1 said ice grid being oriented such that said cavities are inverted;
means for continuously spraying raw water upwardly into said cavities such that ice solids formed from substantially pure water incrementally build up from said heat exchange surfaces of said grid to ultimately fill said cavities while unfrozen contaminants expelled from said ice are continuously rinsed away by said raw water spray and the draining of said water from said cavities;
a refrigeration unit for indirectly cooling the heat exchange surfaces of said grid such that said cavities become filled with said ice within a time period of less than 30 minutes such that dissolved contaminating vapors in the raw water forming said ice are effectively expelled from said ice, and
a means for collecting and rinsing the resulting ice solids with previously purified water.

14. A system for purifying raw water as defined in claim 13, further comprising means for melting the resulting ice solids into purified water.

15. A system for purifying raw water defined in claim 14, wherein said melting means is powered at least in part by the waste heat recovered from the refrigeration unit.

16. A method for purifying raw water having contaminants dissolved therein, comprising the steps of providing an ice grid having heat exchange surfaces that define cavities for producing ice solids having a surface to volume ratio no greater than 10 to 1;
indirectly refrigerating said heat exchange surfaces to a temperature that is less than the freezing point of said raw water; and
continuously flowing said raw water over said ice grid such that ice solids formed from substantially pure water incrementally build up from the heat exchange surfaces of said grid to ultimately fill said cavities while unfrozen contaminants expelled from the incrementally freezing ice in the grid cavities are continuously washed away from said ice by said raw water flow.

17. A method for purifying raw water as defined in claim 16, further comprising the steps of
collecting said ice solids from said ice grid;
rinsing said ice solids with substantially pure water, and
melting said ice solids to form substantially pure water.

18. A method for purifying raw water as defined in claim 17, wherein two ice grids are provided, and wherein ice solids from one ice grid are being dumped, rinsed, and melted while ice is being created in the other ice grid by continuously flowing raw water over the heat exchange surfaces of said other ice grid.

19. A method for purifying raw water as defined in claim 16, further including the steps of orienting said ice grid such that liquid water introduced into said grid cavities drains out of said cavities from gravity.

20. A method for purifying raw water as defined in claim 19, wherein said continuous flow is created by a continuous spraying of raw water into said cavities and a continuous draining of the unfrozen water and contaminants out of said cavities.

21. A method for purifying raw water as defined in claim 19, wherein said ice grid is vertically oriented, such that the cavities defined therein are stacked in higher and lower positions relative to one another, and a continuous flow of raw water is introduced at an upper portion of the ice grid such that said water sequentially drains from said higher to said lower cavities.

22. A method for purifying raw water as defined in claim 21, wherein said cavities of said ice grid are prism-shaped to facilitate a uniform flow pattern of raw water throughout the stacked cavities.

23. A method for purifying raw water as defined in claim 19, wherein ice grid is horizontally oriented such that the cavities defined therein are inverted, and said continuous flow is created by spraying raw water upwardly into said inverted cavities while the unfrozen, contaminated portion of said water continuously drains from said cavities.

24. A method for purifying raw water as defined in claim 16, wherein the temperature of the heat exchanger surfaces of said ice grid is maintained at a temperature that allows the ice to form slowly enough to allow vapor contaminants dissolved in the raw water forming the ice to escape from said ice bodies.

25. A method for purifying raw water as defined in claim 24, wherein the temperature of said heat exchanger surfaces is such that ice solids fill the cavities of the grid anywhere between about 15 and 35 minutes.

26. A method for purifying raw water as defined in claim 16, further including the step of filtering the raw water to remove particulate matter therefrom before flowing it over said ice grid.

27. A method for purifying raw water as defined in claim 16, further including the steps of
    collecting the raw water that is not frozen in the cavities of the ice grid, and
    recirculating said collected water into said continuous flow of raw water.

28. A method for purifying raw water as defined in claim 16, wherein said raw water is sea water.

29. A method for purifying raw water as defined in claim 16, wherein the surface to volume ratio of said ice solids is no greater than 8 to 1.

30. A method for purifying raw water having contaminants dissolved therein, comprising the steps of:
    providing an ice grid having heat exchange surfaces that define cavities for producing ice solids having a surface to volume ratio no greater than 8 to 1;
    orienting said ice grid such that water introduced into the grid cavities drains out of said cavities from gravity;
    indirectly refrigerating said heat exchange surfaces to a temperature that is less than the freezing point of the raw water, and
    continuously flowing said raw water over said ice grid such that ice solids formed from substantially pure water incrementally build up from the heat exchange surfaces of said grid to ultimately fill said cavities while unfrozen contaminants expelled from the incrementally freezing ice are continuously worked away by such flowing and draining of said raw water, the flow rate of said water and the temperature of said heat exchange surfaces being chosen such that said incremental ice forms slowly enough to allow vapor contaminants dissolved ha said raw water to escape from said ice.

* * * * *